Dec. 22, 1959   G. ALEXANDROVSKY   2,917,815
SCREW CONVEYOR AND METHOD FOR ITS MANUFACTURE
Filed March 12, 1957   2 Sheets-Sheet 1

Inventor
GEORGE ALEXANDROVSKY
By
Attorney

Dec. 22, 1959   G. ALEXANDROVSKY   2,917,815
SCREW CONVEYOR AND METHOD FOR ITS MANUFACTURE
Filed March 12, 1957   2 Sheets-Sheet 2

Inventor
GEORGE ALEXANDROVSKY
By
Attorney

# United States Patent Office 2,917,815
Patented Dec. 22, 1959

2,917,815

SCREW CONVEYOR AND METHOD FOR ITS MANUFACTURE

George Alexandrovsky, New York, N.Y.

Application March 12, 1957, Serial No. 645,429

4 Claims. (Cl. 29—156.8)

My invention relates to conveying screws having helical hollow flights and to a method of their manufacture. Such screws are being used either in conveyors or other processing apparatus wherein the screw is mounted on a shaft rotating in a stationary trough or other container, or in tubular conveyors or processors wherein the screw is internally attached to or is integral with a rotating tube.

Screws having hollow flights are widely used in conveying and other processing apparatus where heat transfer is involved i.e. in operations where the processed material is to be cooled, or heated, or dryed, or calcined or the like, and where the heat exchange medium is to be completely isolated from the processed material.

Conveying screws of the type described above are manufactured by pressing of prefabricated specially shaped metallic sheets; and they may have a hollow space in the screw flights which is separated from the hollow space in the shaft of the conveyor screw; as a result of which the heat exchange medium must flow through the conveyor in two separate currents and they are very expensive in manufacture and therefore their application is quite limited.

It is an object of my invention to provide a conveying screw having helical hollow flights which avoid the disadvantages of the known screws, which is cheap in manufacture and which is particularly suited for use in tubular conveyor of the type referred to above.

The difference between the principle of my invention and that of known conveyor screws is that the two hollow separated spaces, in the flights and shaft of existing conveyor screws, require two currents of heat medium whereas in my construction the space between the flights and hollow shaft communicate with each other to form a single uninterrupted space, so that heat exchange fluid may flow as a single current through the conveyor screw.

The said and other objects of my invention will be more fully understood from the following specification when read with the accompanying drawing.

In the drawing

Figure 2:
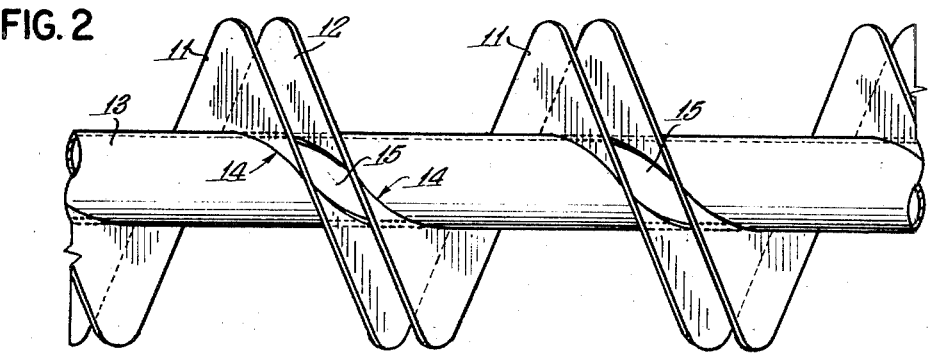
Figs. 2 and 3 show in front view two succeeding stages of said screw during its manufacture.
Figure 3:
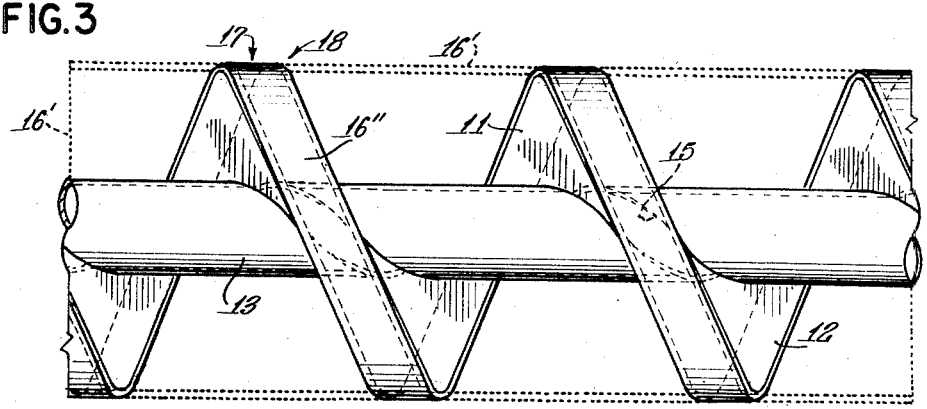
Figure 1:
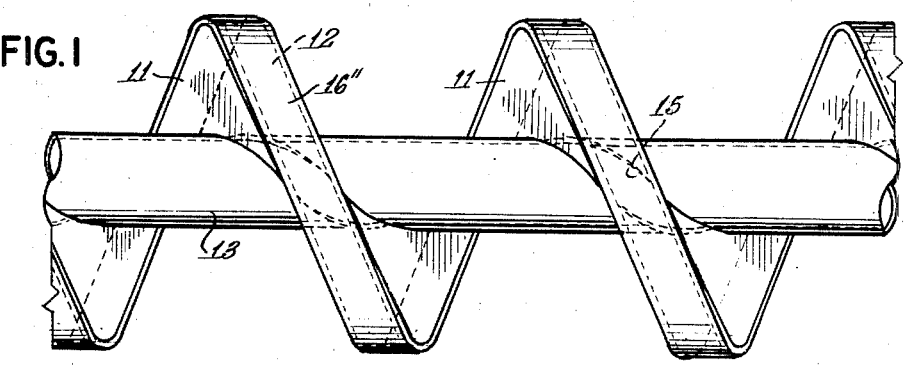
Fig. 1 is a front view of a conveying screw according to my invention.

The conveyor screw shown in Fig. 1 is manufactured in the following manner:

A pair of metallic helical spirals 11, 12 of standard manufacture are mounted in spaced relation upon a tubular shaft 13 and are thereupon welded or otherwise tightly attached thereto at their contacting edges 14 as shown in Fig. 2. It will be observed in Fig. 1 that the distance between the pair of spirals 11, 12 is less than half the length of the pitch of the spirals. Thereafter the portions 15 of the shaft 13 situated between said pair of spirals are cut out for example by an oxygen flame. During the second manufacturing stage, illustrated in Fig. 3 a tubular cover 16 is placed over the assembly shown in Fig. 2, its portions 16' (shown in dotted lines) situated between the flights 21—11 are cut out leaving a spiral strip 16" and the contacting edges 17, 18 are connected by welding or the like, thus finishing the conveyor screw shown in Fig. 1. It will be understood that in said manufacturing operation the outer tube may be cut into the spiral shape 16" shown in Fig. 3 before placing the same over the assembly shown in Fig. 2, or that a sheet strip of spiral shape conforming to the cut out spiral 16" may be used, and that also, if desired, the spiral section 15 may be cut out from the tubular shaft 13 prior to attaching the helical spirals 11, 12 thereupon.

In the embodiment shown in Fig. 1 the liquid or gaseous heat exchange medium is introduced into the tubular shaft 13 and flows through the same and the hollow screw flights formed between the spirals 11, 12 thus effectively heating or cooling or drying the material to be processed.

Figure 5:
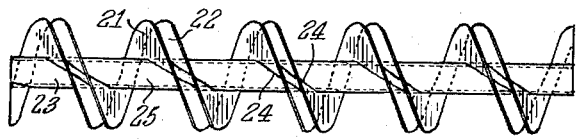
Figs. 5 to 7 show in front view three succeeding stages of said screw during its manufacture.
Figure 6:
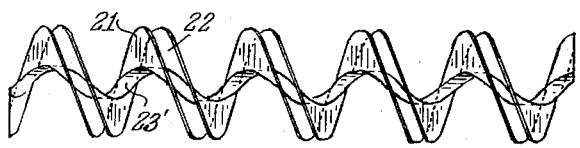
Figure 7:
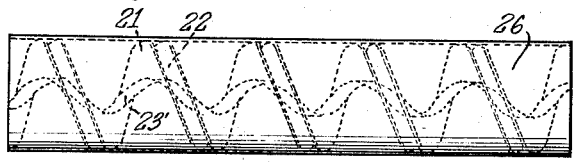
Figure 4:
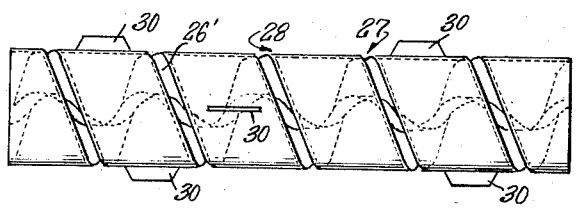
Fig. 4 shows a front view of another embodiment of my new conveying screw for use in a rotary tubular conveyor.
Figure 8:
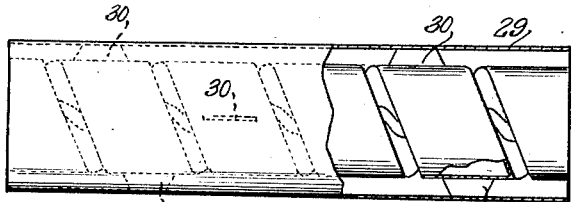
Fig. 8 shows in front view the finished tubular conveyor (the outer tube being partially broken off)
Figure 9:
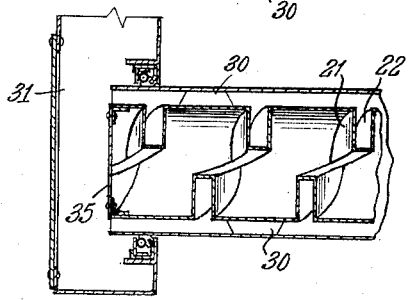
Figs. 9 and 10 show, in longitudinal sections the tubular conveyor attached, respectively, to two different means for supplying the heat exchange medium.
Figure 10:
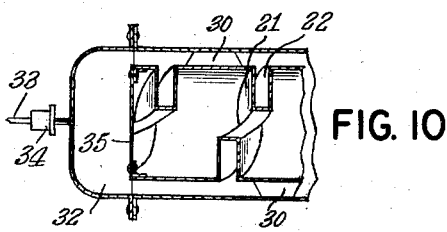

Instead of closing the screw flights of the coordinated spirals 11, 12 at their outer diameter by the strip 16" as shown in Fig. 1 the screw flights of coordinated spirals may be closed at their inner diameter as shown in Fig. 4 and in this form used in a rotary tubular conveyor of the type illustrated in Figs. 8, 9 and 10. Such tubular conveyors are manufactured as follows:

A pair of metallic helical spirals 21, 22 of standard manufacture are mounted in spaced relation upon a tubular member 23 and are thereupon welded or otherwise tightly attached thereto at their contacting edges 24 as shown in Fig. 5. Thereafter the portions 25 of the shaft situated between the spirals 22—21 are cut out leaving a helical strip 23' connecting the said spirals at their inner diameter (Fig. 6). It will be observed in Fig. 5 that the length of portion 25 is more than half the length of the pitch of the spirals 21, 22. Thereupon a tubular body 26 is placed over the assembly shown in Fig. 7, its portions 26' between the spirals 21—22 are cut out as illustrated in Fig. 4 and the contacting edges 27, 28 are tightly connected by welding or the like thus shaping a hollow spiral closed at its inner diameter and open at its outer diameter. It will be well understood that in said manufacturing operation the outer tube 26 and/or the tubular member 23 may be either cut into the required spiral shape before attaching the same to the spirals 21, 22, or may be replaced by a sheet strip of spiral shape.

The assembly shown in Fig. 4 is then placed centrally into the rotary conveyor tube 29 and firmly attached thereto by distancing means such as metal plates 30 or the like. The ends of the conveyor tube 29 may be either, as shown in Fig. 9, rotatably and tightly mounted in a front and a rear container 31, the latter not being shown, the heat exchange medium being supplied from one and emptied into the other container after having flown between the conveyor tube 29 and the conveying screw as well as through the hollow flights thereof. Alternatively as shown in Fig. 10 the tube 29 may be closed at each end by a cover cap 32 and the heat exchange medium introduced by an inlet pipe 33 through a union connection 34 and let out at the other end of the conveyor tube (which is not shown) by a corresponding outlet pipe. In both embodiments the inner space of the conveyor screw is closed at each end against the flow of the heat exchange medium by tightly mounted cover plates 35. For introducing feed into the conveyor more particularly into the inner space of the conveyor screw thereof a conventional feeder (not shown) is attached at or near to its forward end.

While specific embodiments of my invention have been shown and described in detail to illustrate the application of the principles of my invention, it will be well understood that the same may be otherwise executed and embodied without departing from such principles. The Patent Office having made a requirement of restriction, the claims herein are directed to the method. Claims directed to the apparatus disclosed herein are contained in a divisional application, Serial No. 801,359, filed March 23, 1959.

What I claim as my invention is:

1. A method for the manufacture of hollow conveying screws comprising the steps of placing a pair of helical spirals in spaced relation upon a hollow shaft, tightly attaching the inner edges of said spirals to said shaft, removing the portions of said shaft located between the pair of said spirals, placing a tubular cover conforming to the outer diameter of said spirals over the same, removing the portions of said cover between the paired spirals, the portions removed from the shaft and from the cover, respectively, being in staggered position and tightly attaching the outer edges of said spirals to the edges of the spiral shaped part of said cover remaining after said last mentioned removal.

2. A method for the manufacture of hollow conveying screws comprising the steps of placing a pair of helical spirals upon a hollow shaft distanced from each other by less than one half of their pitch, tightly attaching the inner edges of said spirals to said shaft, removing the portions of said shaft located between the pair of said spirals, placing a tubular cover conforming to the outer diameter of said spirals over the same, removing the portions of said cover between the paired spirals, the portions removed from the shaft and from the cover, respectively, being in staggered position and tightly attaching the outer edges of said spiral shaped part of said cover remaining after said last mentioned removal.

3. A method for the manufacture of hollow conveying screws, comprising the steps of placing a pair of helical spirals upon a hollow shaft distanced from each other by more than one half of their pitch, tightly attaching the inner edges of said spirals to said shaft, removing the portions of said shaft located between the pair of said spirals, placing a tubular cover conforming to the outer diameter of said spirals over the same, removing the portions of said cover between the paired spirals, the portions removed from the shaft and from the cover, respectively, being in staggered position and tightly attaching the outer edges of said spirals to the spiral portion of said cover remaining after said last mentioned removal.

4. A method for the manufacture of hollow conveying screws which comprises the steps of placing a pair of helical spirals in parallel spaced relation upon a hollow shaft, removing the portions of said shaft located between the pair of said spirals, then providing a spirally shaped cover portion in strip form conforming to the outer diameter of said spirals over said spirals which strip portion covers the space between the outer edges of said spirals opposite said spiral cut-out portion of said shaft so that the edges of said spirally shaped tubular strip cover portion engage the outer spirally shaped edges of said spirals and then tightly attaching the outer edges of said pair of spirals to the edges of said spirally shaped tubular strip portion.

References Cited in the file of this patent

UNITED STATES PATENTS

| | | |
|---|---|---|
| 1,132,775 | Hille | Mar. 23, 1915 |
| 1,939,080 | Pickard | Dec. 12, 1933 |
| 2,321,185 | Christian | June 8, 1943 |
| 2,733,898 | Christian | Feb. 7, 1956 |
| 2,760,255 | Compton | Aug. 28, 1956 |
| 2,760,624 | Compton | Aug. 28, 1956 |